United States Patent [19]

Haynes

[11] Patent Number: 4,871,247
[45] Date of Patent: Oct. 3, 1989

[54] CORNEA-BORNE IMAGE AND LIGHT DISPLAY DEVICE

[76] Inventor: John B. Haynes, 8615 Balboa Blvd., Apt. 35, Northridge, Calif. 91325

[21] Appl. No.: 162,118

[22] Filed: Feb. 29, 1988

[51] Int. Cl.$^4$ ............................ A61B 3/02; A61B 3/00
[52] U.S. Cl. .................................... 351/219; 351/205; 351/226
[58] Field of Search .................... 351/219, 205, 226

[56] References Cited

U.S. PATENT DOCUMENTS 4,169,664 10/1979 Bailey .................................. 351/219
4,558,698 12/1985 O'Dell ................................ 351/219

Primary Examiner—Rodney B. Bovernick
Attorney, Agent, or Firm—Albert O. Cota

[57] ABSTRACT

A cornea-borne image and light display device (10) comprising a pair of scleral-rider devices (10), (20) similar to contact lenses, which mount on the corneas of the viewer's eyes to present images within the viewer's eyes. The images to the devices is supplied through a respective fiber-optic bundle (14), (16) that derives its light from a light projector (12). Two embodiments are presented, in one, the fiber-optics directly transmit the light source from the projector (12), in the second the optic fibers reflect the light from a plurality of mirrors embedded within the device.

1 Claim, 2 Drawing Sheets

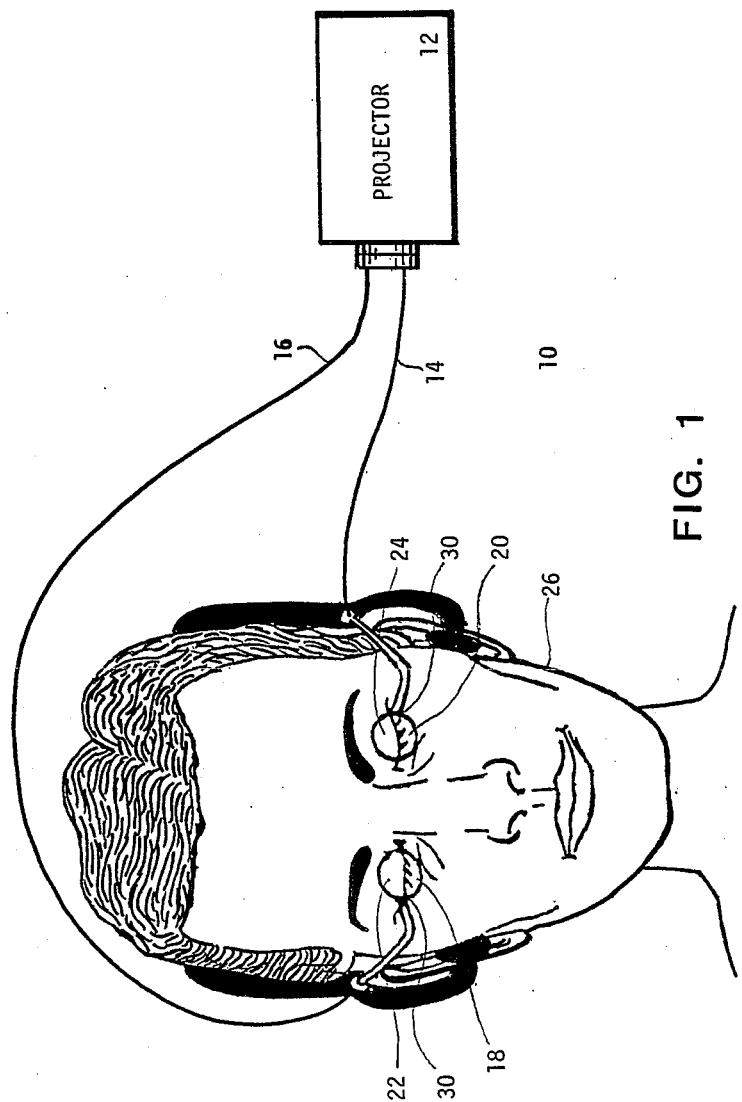

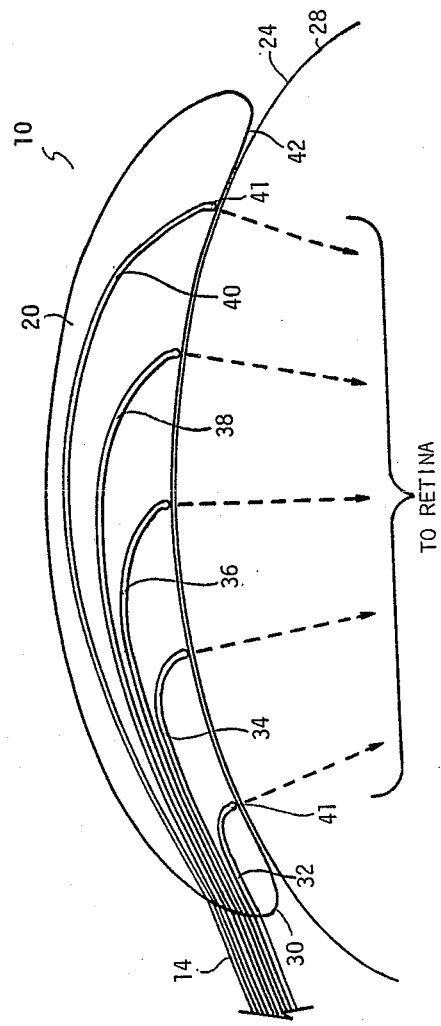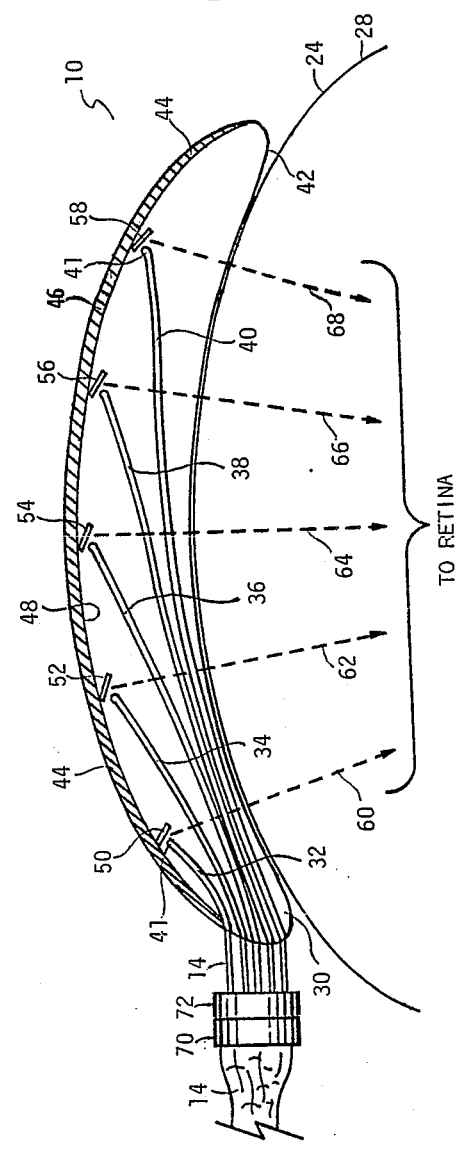

CORNEA-BORNE IMAGE AND LIGHT DISPLAY DEVICE

TECHNICAL FIELD

This invention relates to personal viewing devices and is particularly directed to personal viewing devices mounted on the corneas of a viewer's eyes to provide a unique viewing experience.

BACKGROUND ART

Innumerable devices have been proposed, over the years, to permit an individual to view images, such as photographs, motion pictures, television and the like. However, most of the prior art viewing devices have been designed for simultaneous viewing by a group of individuals. There have been some prior art devices which were designed for personal viewing by one individual. However, all of the prior art viewing -devices have required the user to wear a helmet or means which mounted on the wearer's ears, like a pair of spectacles, or have required the viewer to look into a viewing means attached to the device, such as the "nickleodeons" which were popular in the early part of this century. Unfortunately, all of the prior art devices have precluded the viewer from seeing a full-of-view as the presented image. In addition, virtually all of the prior art viewing devices have presented images which were external to the viewer's eyes. This greatly limits the type and effectiveness of images which can be presented to the viewer.

A search in the U.S. patent office has revealed the following patents:

| U.S. Pat. No. | INVENTOR | ISSUED |
| --- | --- | --- |
| 2,137,887 | Fuller, W. W. J. | 22 Nov. 1938 |
| 2,872,840 | Stanton, A. | 23 Dec. 1953 |
| 2,949,055 | Blackstone, H. | 9 Jul. 1954 |
| 2,955,156 | Hellig, M. | 24 May 1957 |
| 3,059,519 | Stanton, A. | 5 Sep. 1956 |
| 3,142,235 | Siegmund, W. | 21 Nov. 1960 |
| 3,205,303 | Bradley, W. | 27 Mar. 1961 |
| 3,216,778 | Davies, G. et al | 22 Oct. 1962 |
| 3,244,878 | Stein, E. | 19 Sep. 1963 |
| 3,410,638 | Langworthy, J. | 9 Dec. 1965 |
| 3,463,885 | Upton, H. W. | 26 Aug. 1969 |
| 3,529,097 | Hoesli, H. | 16 Feb. 1967 |
| 3,609,016 | Jamplosky, A. | 30 Dec. 1969 |
| 3,670,097 | Jones, J. | 20 Oct. 1969 |
| 4,227,209 | Warner, D. | 7 Oct. 1980 |
| 4,310,849 | Glass, S. | 11 Jun. 1979 |
| 4,322,726 | Collier, A. | 19 Dec. 1979 |
| 4,395,731 | Schoolman, A. | 16 Oct. 1981 |
| 4,403,216 | Yokoi, G. | 22 Apr. 1981 |
| 4,516,157 | Campbell, M. | 27 Oct. 1983 |
| 4,575,722 | Anderson, R. | 11 Mar. 1986 |
| 4,636,866 | Hattori, N. | 13 Jan. 1987 |
| 4,649,434 | Weinblatt, L. | 10 Mar. 1987 |

However, all of the prior art viewing devices form images external to the eye. Consequently, if a viewer blinks or deliberately closes his eyes, he will miss some or all of the image. Furthermore, many of the prior art viewing devices provide a single image which is presented to both of the viewer's eyes. Unfortunately, this prevents stereoscopic viewing and greatly limits the effectiveness of the image presentation. Additionally, many of the prior art viewing devices employ spectacle-type means for supporting the viewing device in front of the viewer's eyes. However, with this type of device, the viewer is always aware of the presence of the device and his peripheral vision will admit a ring of light about the edge of the viewing device which can cause considerable distraction from the presented image.

DISCLOSURE OF THE INVENTION

The disadvantages of prior art personal viewing devices are overcome with the instant invention and a personal viewing device is provided which employs scleral-riders which are similar to contact lenses and which are supported on the corneas of the viewer's eyes and, hence, produces images within the viewer's eyes. Consequently, the viewer cannot, deliberately or otherwise miss any portion of the projected image. Furthermore, the use of cornea-borne scleral-riders means that separate images can be supplied to each of the viewer's eyes to provide truly stereoscopic vision and to present only transmitted image material to be observed by the viewer's peripheral vision.

As indicated above, the advantages of the instant invention are preferably attained by providing a personal viewing device which presents the transmitted image within the cornea-borne scleral-riders which are similar in shape and construction to contact lenses. The riders are supported on the cornea of the viewer's eyes and, hence, provide images within the viewer's s eyes that allows a full field of view without obstruction from peripheral objects and the viewer's nose and cheek bones. This imaging device permits the transmitted image to occupy the viewer's peripheral vision, as well as his direct vision, and permits separate images to be sent to each eye to provide the stereoscopic viewing. It will also be apparent that the prior art spectacle-type viewing devices are relatively heavy on the viewer's nose and are thus uncomfortable to wear for extended time periods.

Accordingly, it is an object of the present invention to provide an improved fixed focus viewing device that utilizes a cornea-borne image and light display. This fixed focus is inherently achieved by the nature of coherent light.

Another object of the present invention is to provide a viewing device that eliminates interruptions by blinking and allows restful and fatigue-free viewing.

A further object of the present invention is to provide a viewing device that allows the viewer's center of attention to be controlled while maintaining a full field of view. This occurs because the imaging does not change with eye movement making the presentation independent of the viewer's eye motion and focus.

An additional object of the present invention is to provide means for presenting images within the viewer's eyes to prevent the viewer from missing some or all of the presented image when the eyes are closed.

An specific object of the present invention is to provide a personal viewing device comprising a pair of imaging devices, similar to contact lenses, which mount on the corneas of the viewer's eyes to present images within the viewer's eyes.

These and other objects and features of the present invention will be apparent from the following detailed description, taken with reference to the figures of the accompanying drawings.

BRIEF DESCRIPTION OF THE DRAWINGS

FIG. 1 is a diagrammatic representation of a personal viewing system embodying the cornea-borne scleral-rider of the present invention.

FIG. 2 is an enlarged horizontal section through one of the cornea-borne viewing devices of the personal viewing system of FIG. 1.

FIG. 3 is a view similar to that of FIG. 2 showing an alternative form of the cornea-borne viewing device of the present invention.

BEST MODE FOR CARRYING OUT THE INVENTION

The best mode for carrying out the invention is presented in terms of two embodiments. The first is a cornea-borne device that utilizes a fiber-optic bundle incorporating a multiplicity of optical fibers to transmit images through a scleral-rider; the second also uses the fiber-optic bundle but in this case, the images are reflected from a plurality of mirrors embedded within the scleral-rider.

The general form of the invention is depicted in FIG. 1 which shows a personal viewing system, indicated generally at 10, comprising a projector 12 which transmits desired images through fiber-optic bundles 14 and 16 to a pair of scleral-riders 18 and 20 which are positioned on the cornea 28 of the eyes 22 and 24 of the viewer 26. As best seen in FIGS. 2 and 3, riders 18 and 20 are transparent and are similar, both in form and material, to conventional contact lenses. Each rider is mounted adjacent to the end of its respective fiber-optic bundle 14 or 16 with the individual fibers of the respective bundle 14 or 16 extending into the adjacent scleral-rider 18 or 20.

The approximate thickness of the scleral-rider 18, 20 is 2 millimeters. This thickness allows sufficient clearance and placement of the fiber-optics and allows the bundle 14, 16 to exit from the respective rider at the outer corner of each eye, thus eliminating much of the interference from the eye-blinking reflex.

The fibers terminate in a position to direct the optical signal carried thereby to the retina of the viewer's eyes. Preferably, the highest concentration of fibers (pixels) should be formed in the center of the riders 18, 20 since this area is constantly in the center of view. Additionally, to allow optimum transmissability and resolution, the terminating end 41 of each optic fiber is rounded and polished to produce a lensing effect. The rounding and polishing technique is well known in the art and is therefore not described.

Since the scleral-riders 18 and 20 are positioned directly on the cornea of the viewer's eyes, as best seen in FIGS. 2 and 3, in the manner of conventional contact lenses, the viewer's eyelids will be outside of the riders 18 and 20, as seen in FIG. 1. Consequently, the image transmitted by the projector 12 will be formed within the viewer's eyes 22 and 24 and blinking or closing of the viewer's eyelids will not interfere with delivery of the transmitted image to the viewer's eyes. It will be apparent that the projector 12 may be substantially any form of image generating and/or lasing device, such as a motion picture or photographic slide projector, a television camera or an optical system, such as a periscope. Also, the projector 12 may be of the type, such as a kalaidoscope, which generates generalized light patterns, rather than discrete images. The kalaidoscope images can be mixed with diffused light, or pulsing light that corresponds to the beat of music that may be heard through a set of headphones concurrently with the light display.

As seen in FIG. 2, the scleral-rider 18,20 is positioned directly on the cornea 28 of the viewer's eye 22. The fiber optic bundle 14 connects to the outer end 30 of the rider while the multiplicity of individual optical fibers represented by the five fibers, 32, 34, 36, 38 and 40, of the bundle 14 extend internally into the rider and terminate adjacent to the inner edge 42 of the rider and are oriented to direct the light carried toward the retina of the viewer's eye 22. The optical fibers 32-40 are appropriately distributed about the interior of the scleral-riders 18, 20.

FIG. 3 shows an alternate form of the viewing device 10. In this form, an opaque layer 44 is formed on the outer surface 46 of the scleral-rider 18, 20 and a plurality of mirror surfaces are formed on the inner surface 48 of the opaque layer 44, as seen at 50, 52, 54, 56 and 58. In this form, the individual optical fibers 32, 34, 36 38 and 40 each terminate adjacent to one of the mirrors 50-58 and direct the light carried by the individual fibers toward the respective mirrors 50-58 to allow the light to be reflected toward the retina of the viewer's eye 22, as indicated by broken lines 60, 62, 64, 66 and 68.

With the transparent lenses 18, as seen in FIG. 2, the viewer will see the image delivered to his eyes by the scleral-riders 18 and 20, but will also be able to see and interact with the world about him. The image delivered by the viewing system 10 will appear to be superimposed on the viewer's view of his surroundings. Thus, for example, for the pilot of a fighter plane, the viewing system 10 of the present invention could deliver images of aiming crosshairs and data regarding range and missile readiness to the pilot without interferring with the pilot's ability to see his environment and to maneuver his airplane. With the opaque version of the rider 18, as seen in FIG. 3, the opaque layer 44 blocks out the viewer's awareness of his surroundings and permits the viewer to concentrate on the transmitted image.

Obviously, the opaque layer 44 could also be employed, if desired, without the mirrors 50 - 58, with the individual optical fibers terminating adjacent the inner edge 42 of the rider 18, as seen in FIG. 2. Moreover, the rider could be formed of opaque material and the layer 44 could be omitted, so that the only light seen by the viewer would be that transmitted by the optical fibers 32-40.

Numerous other variations and modifications may be made to either embodiment without departing from the intent of the present invention. For example, in each of the embodiments, the fiber-optic bundle 14, 16 can be manufactured with a first connector 70 located in the end facing the device that connects to a mating second connector 72 attached to the outer side of the viewing device 18, 20. This modification as shown in FIG. 3 would allow the device 18, 20 to be easily disconnected for cleaning and also, to allow individual devices to be used for different persons.

Another design consideration is the use of a vacuum line which is attached adjacent to the entry of the fiber-optic bundle 14, 16. The vacuum line is similar to the type employed in producing Electro-Retinal-Grams as used in the field of ophthalmalogy for diagnostic purposes. The vacuum line allows the rider 18, 20 to remain within the eye in an optimum fixed position.

The predominate use of the rider 18, 20 is for entertainment primarily in the home. However, the device may also be used with autosuggestion and subliminal self improvement video tapes.

The light transmitting source, whether it be a laser or some form of incandescent light enables geometric images, or the like, of unlimited shapes and color combinations to be viewed in varying intensities. These combinations may be controlled by color wheels or in more sophisticated systems an electronics-microprocessor system may be used to produce preselected or random light patterns. The resulting images fully occupy the field of view of each eye. Thus, the visual senses are bathed in a pleasing combination of light and shape. These light combinations when pulsed to the rhythm of music, heard preferably through an audio headset, add a second dimension to the mood setting capability of the system 10. To add further enjoyment to the invention, an integrated unit consisting of the visual system and the audio headset, can be built into the headrest of a recliner chair.

In addition to the system's entertainment and potential learning capabilities, the system 10 is also expected to be suitable in sleep and dream research and in the areas of psychotherapy, hypnotism, autism and other related medical fields.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

I claim:

1. A cornea-borne image and light display device comprising:
   (a) projector means for generating desired images,
   (b) a pair of viewing scleral-riders positionable on the corneas of the viewer's eyes where an opaque layer covers the outer surface of said scleral-riders and a plurality of mirror surfaces are formed on the inner surface of said opaque layer, and
   (c) a pair of fiber-optic bundles each connecting said projector means to a respective end of said scleral-riders where the individual optical fibers of each of said bundles extend into said scleral-riders and terminate adjacent to one of said mirror surfaces to cause light from said optical fibers to be reflected by said mirror surfaces to the retina of the viewer's eye.

* * * * *